United States Patent
Shah et al.

(10) Patent No.: US 8,869,280 B2
(45) Date of Patent: Oct. 21, 2014

(54) METHOD AND SYSTEM FOR AUTOMATIC DETECTION OF EAVESDROPPING OF AN ACCOUNT BASED ON IDENTIFIERS AND CONDITIONS

(75) Inventors: Purshotam Shah, Karnataka (IN); Deepak Kumar Vasthimal, Karnataka (IN)

(73) Assignee: Yahoo! Inc., Sunnyvale, CA (US)

( * ) Notice: Subject to any disclaimer, the term of this patent is extended or adjusted under 35 U.S.C. 154(b) by 71 days.

(21) Appl. No.: 13/462,299

(22) Filed: May 2, 2012

(65) Prior Publication Data
US 2013/0298238 A1 Nov. 7, 2013

(51) Int. Cl.
*G06F 11/00* (2006.01)

(52) U.S. Cl.
USPC .......................................................... 726/23

(58) Field of Classification Search
CPC ............ H04L 63/1416; H04L 63/1408; H04L 12/2602; H04L 63/1441; H04L 63/1425; H04L 62/22; G06F 21/552; G06F 21/554; G06F 21/316; G06F 21/00; G06F 21/60; G06F 21/62
USPC .......................................................... 726/23
See application file for complete search history.

(56) References Cited

U.S. PATENT DOCUMENTS

| | | | | |
|---|---|---|---|---|
| 7,971,237 B2 * | 6/2011 | Caslin et al. | | 726/7 |
| 8,085,936 B2 * | 12/2011 | Peel et al. | | 380/277 |
| 8,286,233 B1 * | 10/2012 | Boland et al. | | 726/17 |
| 8,316,224 B2 * | 11/2012 | Vidal et al. | | 713/100 |
| 8,443,361 B2 * | 5/2013 | Vidal et al. | | 717/177 |
| 2001/0037453 A1 * | 11/2001 | Mitty et al. | | 713/168 |
| 2003/0159070 A1 * | 8/2003 | Mayer et al. | | 713/201 |
| 2006/0143126 A1 * | 6/2006 | Vasishth et al. | | 705/51 |
| 2006/0271789 A1 * | 11/2006 | Satomura et al. | | 713/183 |
| 2007/0156886 A1 * | 7/2007 | Srivastava | | 709/224 |
| 2008/0010678 A1 * | 1/2008 | Burdette et al. | | 726/15 |
| 2009/0157708 A1 * | 6/2009 | Bandini et al. | | 707/100 |
| 2009/0293121 A1 * | 11/2009 | Bigus et al. | | 726/22 |
| 2012/0071131 A1 * | 3/2012 | Zisapel et al. | | 455/410 |
| 2012/0167162 A1 * | 6/2012 | Raleigh et al. | | 726/1 |
| 2012/0259648 A1 * | 10/2012 | Mallon et al. | | 705/2 |
| 2012/0278868 A1 * | 11/2012 | Boding et al. | | 726/5 |
| 2013/0110565 A1 * | 5/2013 | Means et al. | | 705/7.11 |

OTHER PUBLICATIONS

Chari et al., "A BigData Platorm for Analytics on Access Control Policies and Logs", Jun. 2013, ACM, p. 185-188.*

(Continued)

*Primary Examiner* — Kambiz Zand
*Assistant Examiner* — Demaris Brown
(74) *Attorney, Agent, or Firm* — James J. DeCarlo; Greenberg Traurig, LLP

(57) ABSTRACT

A system and method for detecting whether a user account has been compromised. A server computer determines, for a client device, a first identifier associated with the client device. The server computer analyzes an activity log associated with an account of a user to determine if an eavesdropping condition has been met during a given duration. The analysis includes: 1) determining that an eavesdropping activity has occurred during the given duration and determining that no normal activity has occurred during the given duration for the first identifier; 2) determining a second identifier associated with a second device used to access the user account; and 3) determining that a normal activity associated with the second identifier has occurred during the given duration.

19 Claims, 7 Drawing Sheets

(56) References Cited

OTHER PUBLICATIONS

Frias-Martinez et al., "A Network Access Control Mechanism Based on Behavior Profiles", 2009, IEEE, p. 3-12.*

Puttaswamy et al., "Improving Anonymity Using Social Links", 2008, IEEE, p. 15-20.*

Shan et al., "Safe Side Effects Commitment for OS-Level Virtualization", Jun. 2011, ACM, p. 111-120.*

* cited by examiner

METHOD AND SYSTEM FOR AUTOMATIC DETECTION OF EAVESDROPPING OF AN ACCOUNT BASED ON IDENTIFIERS AND CONDITIONS

FIELD

The present disclosure relates to detecting eavesdropping of an account, and more specifically to detecting eavesdropping of an account based on identifiers and conditions.

BACKGROUND

An eavesdropper may be able to gain access to a user's account (e.g., an email account, a social networking account, an online bank account). For example, an eavesdropper can obtain access to the user's account by guessing the user's username and password based on common phrases and numbers. Alternatively, an eavesdropper may be able to install malware on a user's computer (e.g., when the user selects a link in an email message). This malware can then provide the eavesdropper with the user's username and/or password the next time the user logs into his or her email account. An eavesdropper may also be able to gain access to a user's email account via spy software, via a phishing website, via implementing one or more computer commands (e.g., Linux commands), etc.

Once the eavesdropper gains access to the user account, the eavesdropper often performs eavesdropping activities but does not change the state of the account. For example, the eavesdropper may read an unread email and then, after reading the email, mark the email as unread. Thus, the eavesdropper does not change the state of the email account and, when the user logs into his or her account at a later time, the user will not know that the user's account has been compromised.

SUMMARY

In one aspect, a server computer determines, for a client device, a first identifier associated with the client device. The server computer analyzes an activity log associated with an account of a user to determine if an eavesdropping condition has been met during a given duration. The analysis includes: 1) determining that an eavesdropping activity has occurred during the given duration and determining that no normal activity has occurred during the given duration for the first identifier; 2) determining a second identifier associated with a second device used to access the user account; and 3) determining that a normal activity associated with the second identifier has occurred during the given duration. In one embodiment, the server computer communicates a result of the analysis to the user, such as by emailing the user at an alternate email address to change the user's password or by calling or texting the user at a cell phone number to change the user's password.

In one embodiment, the server computer stores an activity that occurs for the account in the activity log. In one embodiment, the server computer groups the activity into a user activity group based on an identifier, such as the first identifier or the second identifier. In one embodiment, the server computer marks the account of the user as compromised.

The analyzing of the activity to determine if an eavesdropping condition is met can include one or more determinations, such as determining that an unread email is read and then marked as unread, determining that chat history has been searched, determining that emails have been searched using a keyword, determining that an email message has been sent and then deleted from the sent items folder, determining that a chat session has occurred and then its logs have been deleted from chat history, and/or determining that an attachment from a read email has been downloaded.

The determining that a normal activity has occurred can include one or more determinations, such as determining that an incoming email is read and not marked as unread, determining that an email is sent and not deleted from a sent items folder, and/or determining that a chat has occurred with another user and a chat history for the chat has not been deleted. In one embodiment, the server computer communicates a notification message to the user requesting the user to change a password associated with the account.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
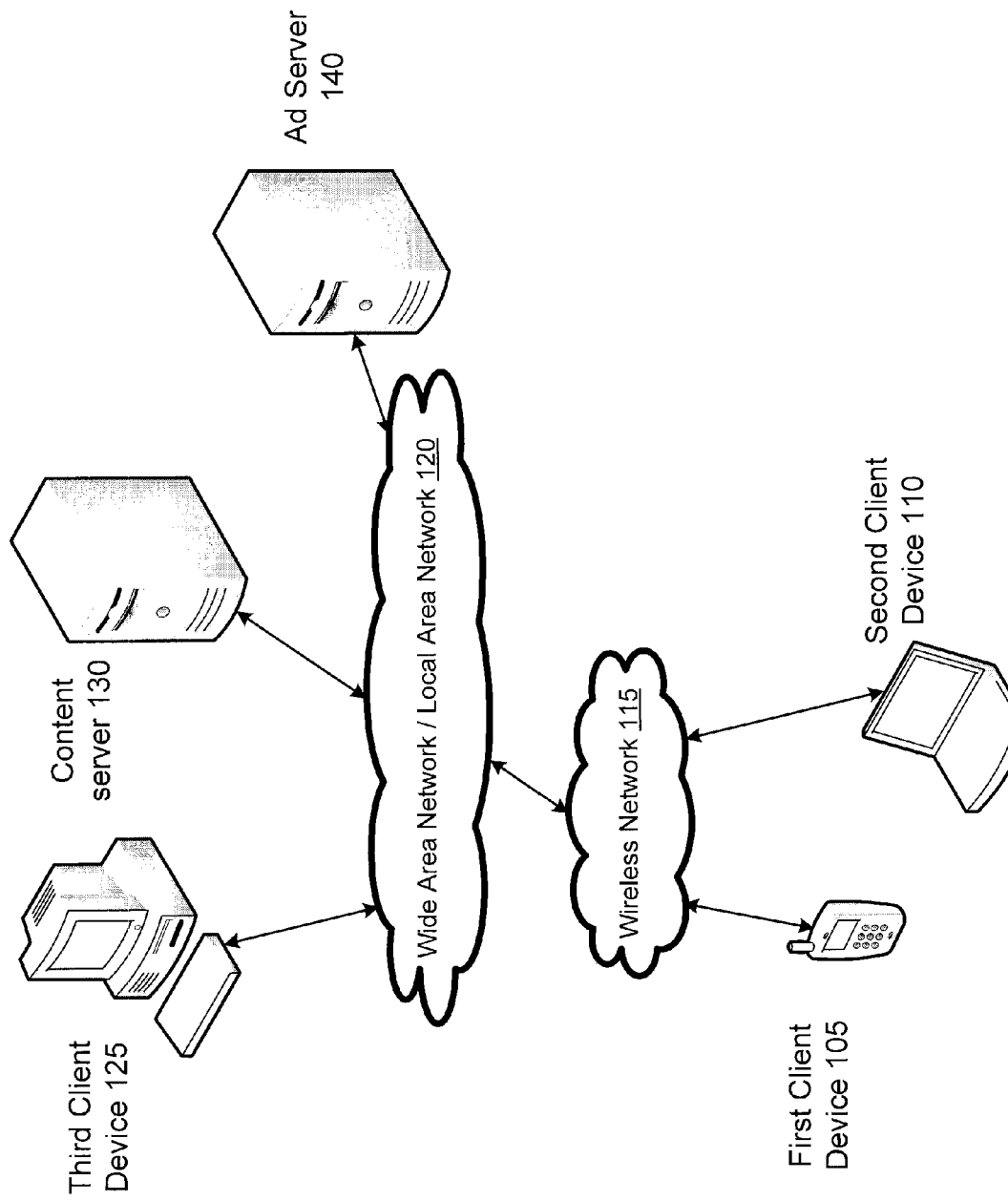
FIG. 1 is a block diagram of client devices communicating over a network with server computers in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present disclosure is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a schematic diagram illustrating an example embodiment of a network and devices implementing embodiments of the present disclosure. Other embodiments that may vary, for example, in terms of arrangement or in terms of type of components, are also intended to be included within claimed subject matter. FIG. 1 includes, for example, a first client device 105 and a second client device 110 in communication over a wireless network 115. The wireless network 115 is connected to a local area network (LAN)/wide area network (WAN) 120, such as the Internet, so that the first client device 105 and the second client device 110 can communicate with a third client device 125, a content server 130 (also referred to below as server computer 130 or server 130), and/or an ad server 140. Although shown as a wireless network 115 and WAN/LAN 120, the first client device 105 and/or the second client device 110 can communicate with each other, the third client device 125 and/or servers 130, 140 via any type of network.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content server 130 may include a device that includes a configuration to provide content via a network to another device. A content server 130 may, for example, host a site, such as a social networking site, examples of which may include, without limitation, Flickr®, Twitter®, Facebook®, LinkedIn®, or a personal user site (such as a blog, vlog, online dating site, etc.). A content server 130 may also host a variety of other sites, including, but not limited to business sites, educational sites, dictionary sites, encyclopedia sites, wikis, financial sites, government sites, etc.

Content server 130 may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Each client device 105, 110, 125 is identified by an associated identifier. The identifier can be, for example, an Internet Protocol (IP) address, a Media Access Control (MAC) address, a mobile telephone number, an International Mobile Equipment Identity (IMEI) number, etc. Suppose the first client device 105 is a device that the user uses to access an email account provided by the content server 130. In one embodiment, the user logs into the server 130 to access his or her email account. The login information typically includes a username and password.

Figure 2A:
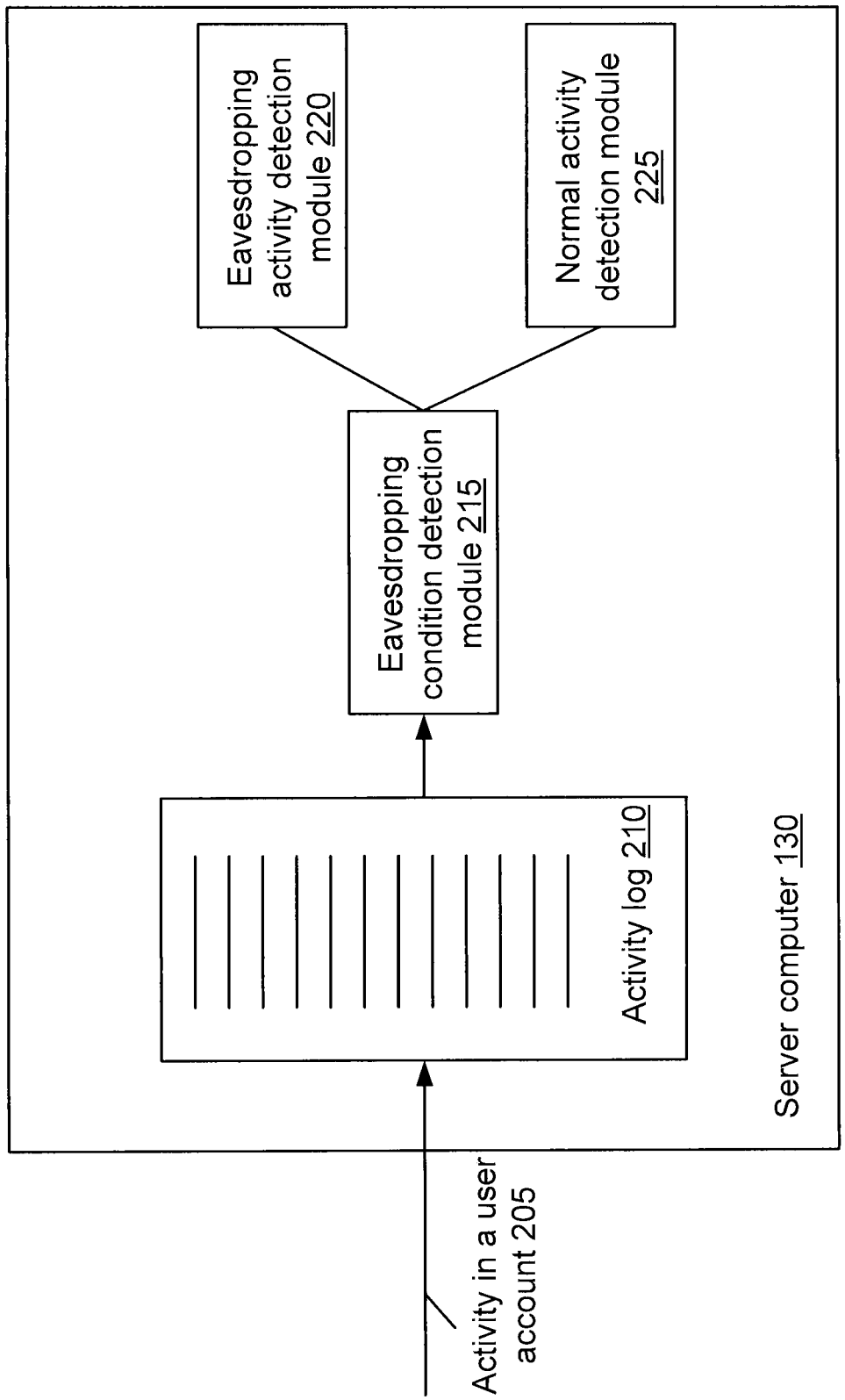
FIG. 2A is a block diagram of a server computer in accordance with an embodiment of the present disclosure.
Figure 2B:
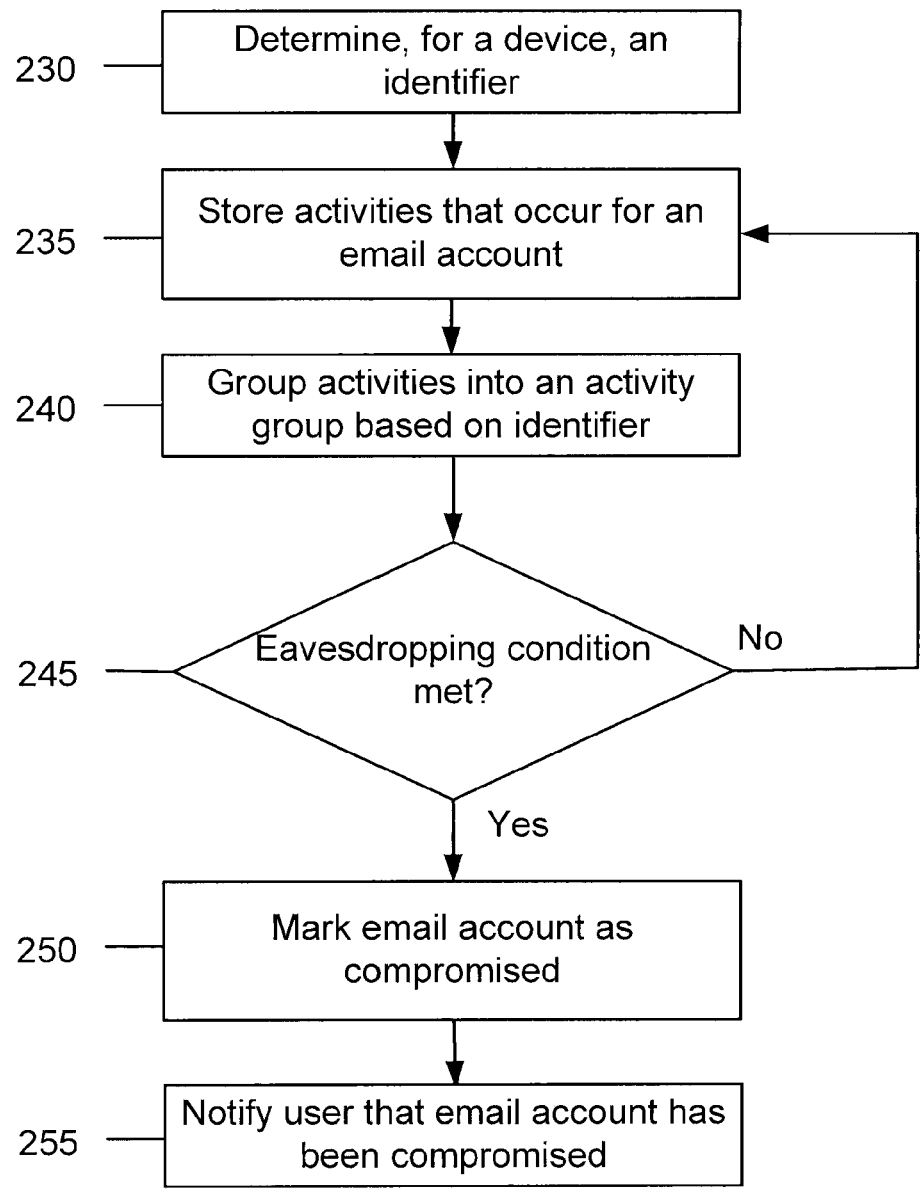
FIG. 2B is a flowchart illustrating steps performed by the server computer to determine whether an eavesdropping condition has been met in accordance with an embodiment of the present disclosure.

Also referring to FIGS. 2A and 2B, a user uses a client device such as the first client device 105 to access an account of the user via the server computer 130, such as accessing an email account of the user. The server computer 130 determines, for the device 105, the identifier associated with the device 105 (Step 230). The user can access the email account and perform operations associated with the email account, such as reading an email, sending an email, chatting with another user, etc. In one embodiment, the sever computer 130 stores activities (e.g., activity 205) that occur (e.g., that are performed by the user) for the email account in an activity log 210 (Step 235). In one embodiment, the activity log 210 is a listing of activities (e.g., activity 205) performed when the user's email account is accessed. In one embodiment, the server computer 130 groups activities into an activity group based on the identifier for the device used to access the account (Step 240). The server computer 130 can group the entries of the activity log 210 in any manner, such as by identifier (as described above), by action (e.g., all emails sent are grouped together, all read emails are grouped together, etc.), by time of entry into the activity log 210, by time of activity, etc. Although described as one activity log 210, the server computer 130 may store activities associated with a user account in a plurality of activity logs. The server computer 130 includes an eavesdropping condition detection module 215 to determine whether an eavesdropping condition has been met (Step 245) for the account.

In one embodiment, this determination occurs (e.g., simultaneously) for each identifier in the activity log 210. In one embodiment, this determination occurs after an activity 205 is stored in the activity log 210, after a given number of activities occurs for an identifier, after a given number of activities occur for the account, periodically, based on a schedule, etc. In one embodiment, this determination occurs based on a schedule or duration set by the user, such as determining if an eavesdropping condition has been met daily, weekly, after ten activities have been performed with respect to the email account, etc.

As described in more detail below, the eavesdropping condition detection module 215 utilizes an eavesdropping activity detection module 220 and a normal activity detection module 225 to determine if an eavesdropping condition has been met in step 245. The eavesdropping activity detection module 220 determines if an eavesdropping activity has occurred during a given duration for an identifier. The normal activity detection module 225 determines whether a normal activity has occurred during the given duration for an identifier.

If an eavesdropping condition has not been met in step 245, the server computer 130 returns to step 235 and continues to store activities that occur for the email account. Thus, the process in one embodiment is a recursive process, as the server computer 130 repeatedly checks to see if the email account has been accessed by an eavesdropper (by repeating steps 235-245). An eavesdropper is an entity (e.g., a person) that by some means has access to a user's account information (e.g., account password). Eavesdroppers secretly access the user account without the user's consent such that the state of the account does not change and, therefore, the user is not aware that the account has been compromised.

If an eavesdropping condition has been met, the server computer 130 marks the email account as being compromised (Step 250). The server computer 130 then notifies the user that his or her email account has been compromised (Step 255). In one embodiment, the server computer 130 notifies the user by emailing the user via an alternate email address (e.g., that the user previously provided, such as during registration for the email account). In another embodiment, the server computer 130 sends a text message to the user's mobile telephone, calls the user's mobile telephone and plays a recorded message indicating that the user's email account has been compromised, communicates a message via the user's social media account (e.g., posts a message on the user's FACEBOOK page), etc.

For example, suppose an eavesdropper gets access to the credentials (e.g., username and password) of a user's email account (e.g., by guessing the account credentials, obtaining the account credentials via a phishing website or by spying on the user's inputs when the user access the email account, etc.). The eavesdropper uses the second client device 110 to access the user's email account via the server computer 130. The server computer 130 determines the identifier associated with the second client device 110 and begins storing activities performed by the eavesdropper in the activity log 210. The server computer 130 groups these activities together based on the second client device's identifier and, as described in more detail below, determines if an eavesdropping condition is met. Suppose the server computer 130 determines that an eavesdropping condition is met. The server computer 130 can then mark the user's email account as compromised and can notify the user that his or her account has been compromised.

Figure 3:
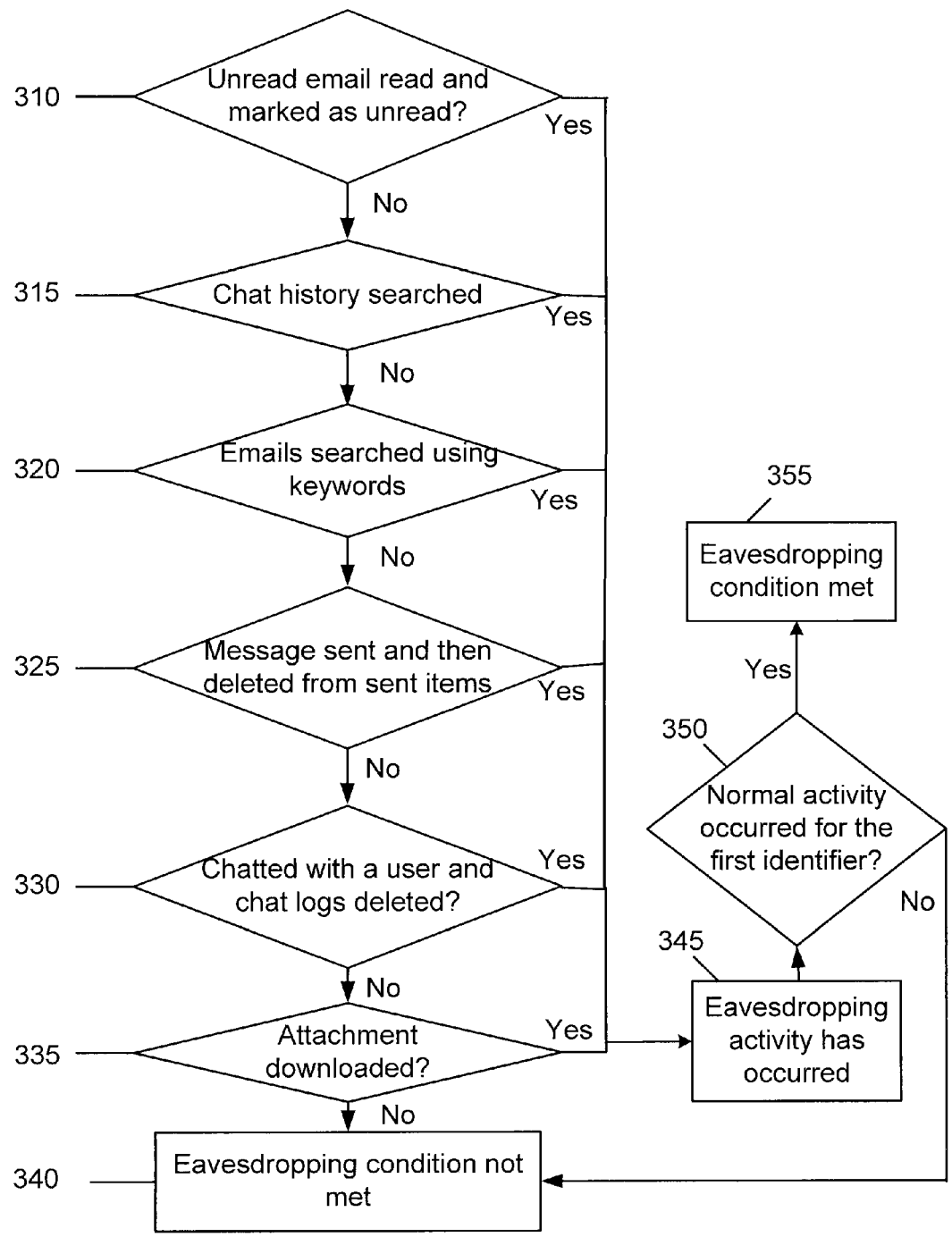
FIG. 3 is a flowchart illustrating steps performed by the server computer to determine whether an eavesdropping activity has occurred in accordance with an embodiment of the present disclosure.

FIG. 3 is a flowchart of an embodiment of steps performed by the server computer 130 to determine if an operation stored in the activity log 210 is an eavesdropping condition (as shown in FIG. 2B as Step 245). The server computer 130 determines whether an unread email has been read and then marked as unread (Step 310). If not, the server computer 130 determines if chat history of the email account has been searched (Step 315). If not, the server computer 130 determines if the emails stored in the user account have been searched using one or more keywords (Step 320). If not, the server computer 130 determines if an email message has been sent and then deleted from the Sent Items folder (Step 325). If not, the server computer 130 determines if the user account was used in a chat session with another user and then the chat logs were deleted (Step 330). If not, the server computer 130 determines if an attachment of an email message was downloaded (Step 335). If not, then the server computer 130 determines that an eavesdropping condition has not been met (Step 340). In one embodiment, as shown in FIG. 2B, the server computer 130 returns to step 235 and repeats steps 235-245.

If one of the steps 310-335 has occurred, there is no change in the state of the account for the user. The server computer 130 (the eavesdropping activity detection module 220) then determines that an eavesdropping activity has occurred (Step 345). If an eavesdropping activity has occurred for second identifier (Step 345), the server computer 130 (the normal activity detection module 225) determines if a normal activity (described in more detail below with respect to FIG. 4) has occurred for the first identifier (Step 350). If a normal activity has occurred for the first identifier for the user email account, the server computer 130 determines that an eavesdropping condition has been met (Step 355) and continues as shown in FIG. 2B with steps 250-255. If, however, the server computer 130 determines that a normal activity has not occurred for the first identifier from the activity log, the server computer 130 determines that an eavesdropping condition has not been met (Step 340). Although shown as consecutive steps 310-335, in another embodiment the server computer 130 determines in parallel (e.g., in real time) whether one or more of the steps 310-335 has occurred.

Figure 4:
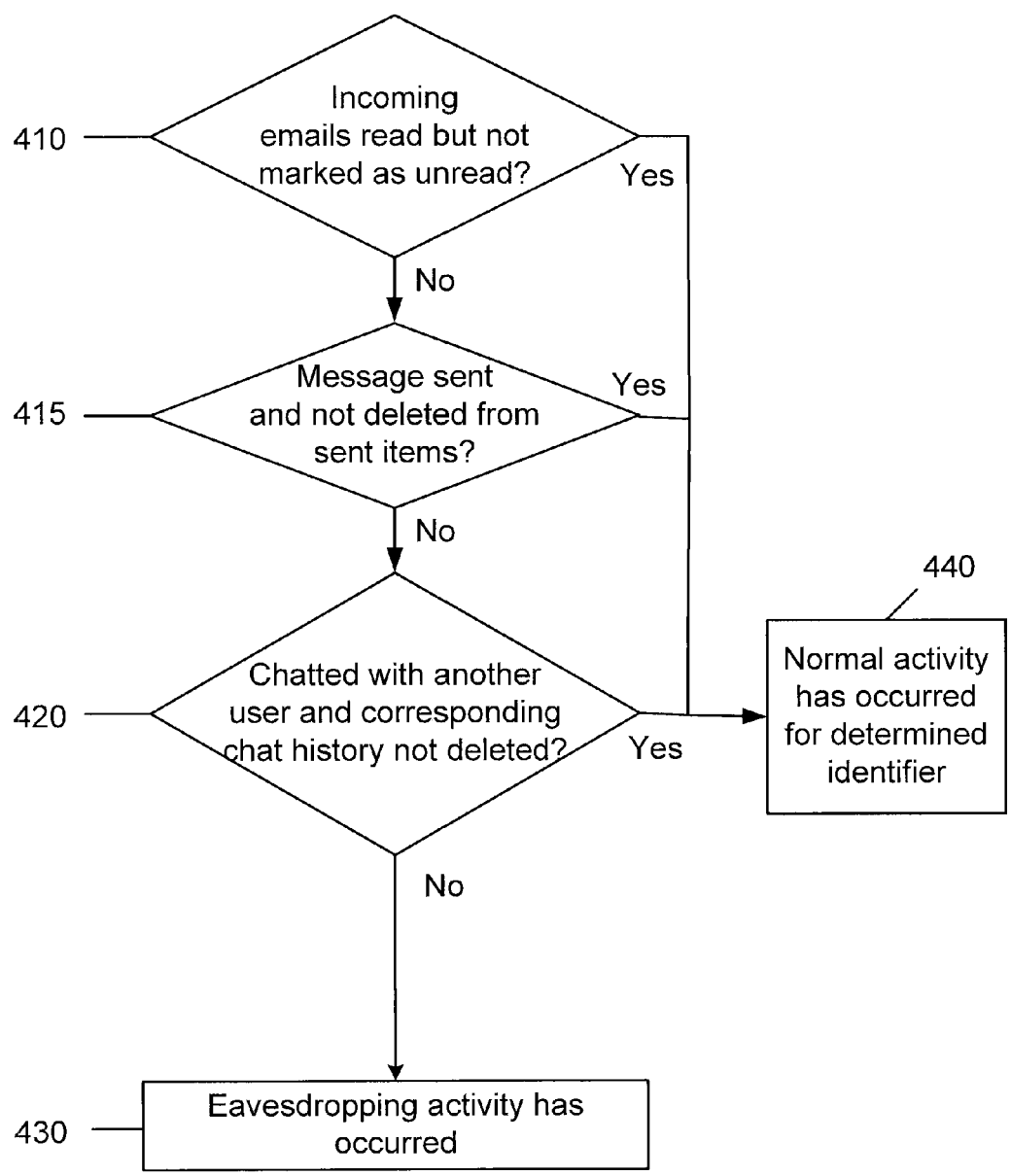
FIG. 4 is a flowchart illustrating steps performed by the server computer to determine whether a normal activity has occurred in accordance with an embodiment of the present disclosure.

FIG. 4 shows a flowchart of an embodiment of steps performed by the server computer 130 (the normal activity detection module 225) to determine if a normal activity has occurred for an identifier (as described above with respect to Step 350). In one embodiment, the server computer 130 determines an identifier of a device (e.g., determines a second identifier associated with the second client device 110 used to access the user account). The server computer 130 determines, in one embodiment, if one or more incoming emails are read but not then marked as unread (Step 410). If not, the server computer 130 determines if an email message was sent and not deleted from the Sent Items folder (Step 415). If not, the server computer 130 determines that the user of the device chatted with another user and did not delete the corresponding chat history (Step 420). If not, the server computer 130 determines that an eavesdropping activity has occurred (Step 430). If any of Steps 410-420 did occur, the server computer 130 determines that normal activity has occurred for the determined identifier (Step 440) and therefore continues to Step 350 of FIG. 3. Therefore, an eavesdropping condition has not been met. Although shown as consecutive steps 410-420, in another embodiment the server computer 130 determines in parallel (e.g., in real time) whether one or more of the steps 410-420 has occurred.

Thus, in one embodiment an email account is marked as compromised if the following conditions are met for a given duration (e.g., time duration, such as one or more days, weeks, or months, or a number of messages such as for 50 messages, 100 messages, etc.):
1) An eavesdropping activity has occurred during the given duration and no normal activity has occurred during the given duration for a first identifier, and
2) A normal activity associated with a second identifier has occurred during the same given duration.

In another embodiment, an email account is marked as compromised when both conditions identified above are met.

In one embodiment, once an email account has been found to be compromised, the server computer 130 can block any access to the account. As described above, the server computer 130 can also communicate a notification to the user that the user's account has been compromised. In one embodiment, the notification instructs the user to change his or her login information (e.g., password) so that an eavesdropper would no longer be able to access the email account.

Although described above with respect to email accounts, the above disclosure can be applied to other user accounts, such as a user's social networking account or a user's online account (e.g., for a financial institution such as a bank). In one embodiment, an eavesdropper gains access to the user's social networking account by obtaining a user's cookie associated with the social networking account (e.g., HTTP session hijacking) With respect to a user's social networking account, various conditions could be checked for eavesdropping activity. For example, the server computer 130 may have social networking conditions that, when met, result in the server computer 130 marking the social networking account of the user as being compromised. Examples for eavesdropping actions for a social networking account that, when met, result in the server computer 130 marking the social networking account as being compromised can include copying what a user has liked and/or disliked on the social networking site, determining who are the user's friends or connections on the social networking site, determining which groups the user belongs to on the social networking site, viewing of uploaded albums, messages, account settings, privacy settings, and event notifications/invitations that the user has received, chat with friends and delete chat history, etc. A few examples of normal activity include posting a message to the user's wall, sending a message and not deleting it, chatting with a user and not deleting the chat history, commenting on posts/photos, liking some page/post/photo, sending and accepting friend requests, etc.

With respect to a user's online account, such as an account associated with a financial institution, the server computer 130 may consider an eavesdropping activity to be met based on one or more of the following activities: 1) downloading/viewing account statement, 2) the sending of a message from the account and then deleting the record of the sent message, 3) viewing payee list, contact details, etc. Examples of normal activity include transferring funds, utility bill payment, changing contact information, sending a message to customer care and not deleting it, etc.

In one embodiment, the user can set or tailor the eavesdropping condition or eavesdropping activity, such as setting that an eavesdropping activity has occurred only if an unread email message has been read and then marked as unread. Further, in one embodiment, the user can set or tailor what constitutes a normal activity for the user's account. In one embodiment, the server computer 130 provides a user interface to the user (e.g., when the user signs up for the user account) to provide settings on what constitutes an eavesdropping activity, an eavesdropping condition, and/or a normal activity.

In one embodiment, the server computer 130 and/or the ad server 140 communicate one or more advertisements as part of the notification message from the server computer 130. The advertisement(s) may be, for example, for an online security package provided by the service provider (e.g., Yahoo!) associated with the server computer 130 to better protect against future eavesdropping of the user account. The advertisement(s) may also be for one or more products or services. In one embodiment, the advertisements are associated with the user's activities that have been stored in the activity log. In one embodiment, the advertisements are targeted ads relating to the subject or text of emails sent from or received by the user's email account, etc.

A process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers.

For web portals like Yahoo!, advertisements may be displayed on web pages resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users.

One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Ad server 140 comprises a server that stores online advertisements for presentation to users. "Ad serving" refers to methods used to place online advertisements on websites, in applications, or other places where users are more likely to see them, such as during an online session or during computing platform use, for example.

During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Figure 5:
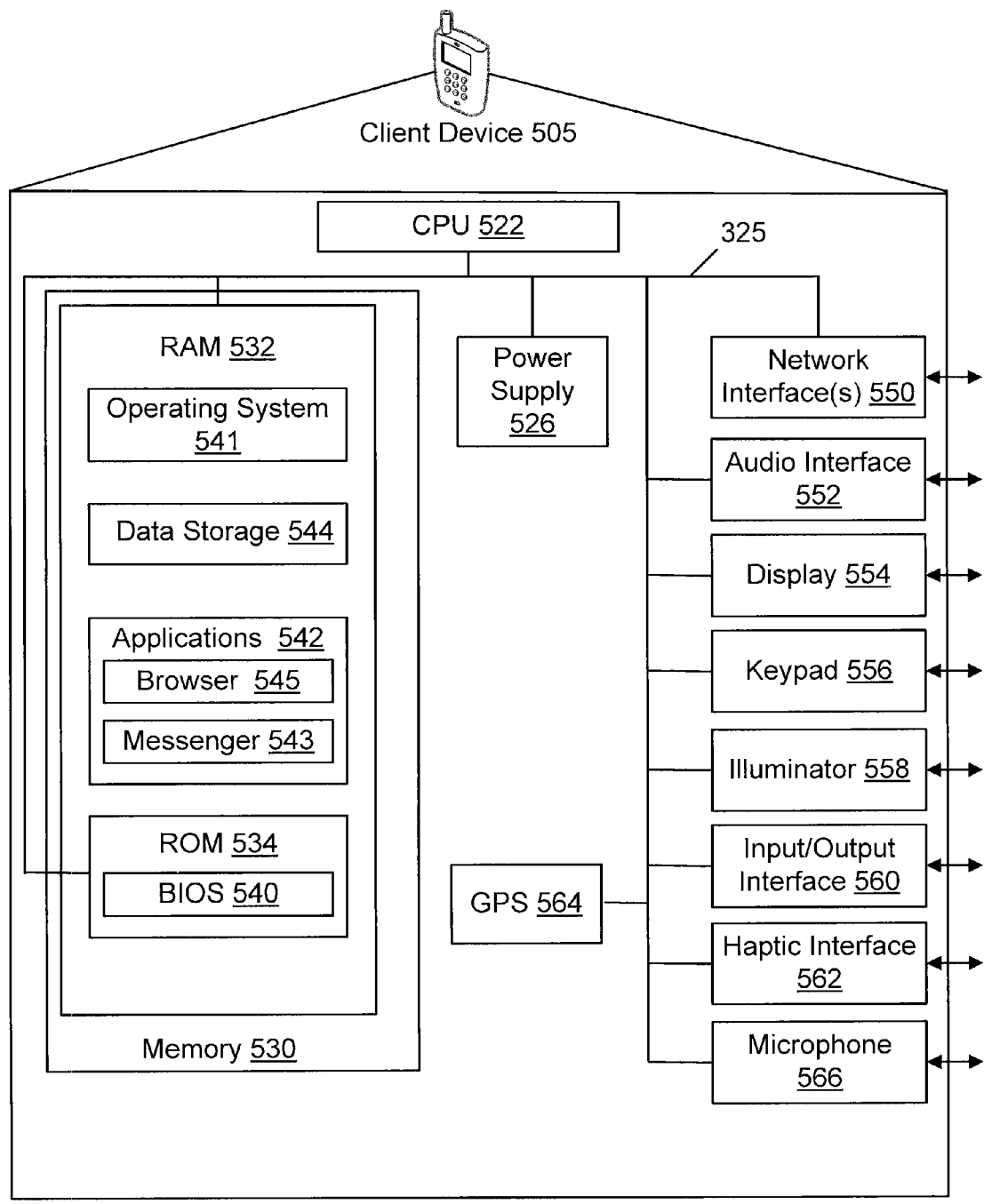
FIG. 5 is a block diagram of components of a client device in accordance with an embodiment of the present disclosure.

FIG. 5 shows one example of a schematic diagram illustrating a client device 505 (e.g., client device 105). Client device 505 may include a computing device capable of sending or receiving signals, such as via a wired or wireless network. A client device 505 may, for example, include a desktop computer or a portable device, such as a cellular telephone, a smartphone, a display pager, a radio frequency (RF) device, an infrared (IR) device, a Personal Digital Assistant (PDA), a handheld computer, a tablet computer, a laptop computer, a digital camera, a set top box, a wearable computer, an integrated device combining various features, such as features of the foregoing devices, or the like.

The client device 505 may vary in terms of capabilities or features. Claimed subject matter is intended to cover a wide range of potential variations. For example, a cell phone may include a numeric keypad or a display of limited functionality, such as a monochrome liquid crystal display (LCD) for displaying text, pictures, etc. In contrast, however, as another example, a web-enabled client device may include one or more physical or virtual keyboards, mass storage, one or more accelerometers, one or more gyroscopes, global positioning system (GPS) or other location-identifying type capability, of a display with a high degree of functionality, such as a touch-sensitive color 2D or 3D display, for example.

A client device 505 may include or may execute a variety of operating systems, including a personal computer operating system, such as a Windows, iOS or Linux, or a mobile operating system, such as iOS, Android, or Windows Mobile, or the like. A client device may include or may execute a variety of possible applications, such as a client software application enabling communication with other devices, such as communicating one or more messages, such as via email, short message service (SMS), or multimedia message service (MMS), including via a network, such as a social network, including, for example, Facebook®, LinkedIn®, Twitter®, Flickr®, or Google+®, to provide only a few possible examples. A client device may also include or execute an application to communicate content, such as, for example, textual content, multimedia content, or the like. A client device may also include or execute an application to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

As shown in the example of FIG. 5, client device 505 may include one or more processing units (also referred to herein as CPUs) 522, which interface with at least one computer bus 525. A memory 530 can be persistent storage and interfaces with the computer bus 525. The memory 530 includes RAM 532 and ROM 534. ROM 534 includes a BIOS 540. Memory 530 interfaces with computer bus 525 so as to provide information stored in memory 530 to CPU 522 during execution of software programs such as an operating system 541, application programs 542, device drivers, and software modules 543, 545 that comprise program code, and/or computer-executable process steps, incorporating functionality described herein, e.g., one or more of process flows described herein. CPU 522 first loads computer-executable process steps from storage, e.g., memory 532, data storage medium/media 544, removable media drive, and/or other storage device. CPU 522 can then execute the stored process steps in order to execute the loaded computer-executable process steps. Stored data, e.g., data stored by a storage device, can be accessed by CPU 522 during the execution of computer-executable process steps.

Persistent storage medium/media 544 is a computer readable storage medium(s) that can be used to store software and data, e.g., an operating system and one or more application programs. Persistent storage medium/media 544 can also be used to store device drivers, such as one or more of a digital camera driver, monitor driver, printer driver, scanner driver, or other device drivers, web pages, content files, playlists and other files. Persistent storage medium/media 506 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 505 can also include one or more of a power supply 526, network interface 550, audio interface 552, a display 554 (e.g., a monitor or screen), keypad 556, illuminator 558, I/O interface 560, a haptic interface 562, a GPS 564, and/or a microphone 566.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Figure 6:
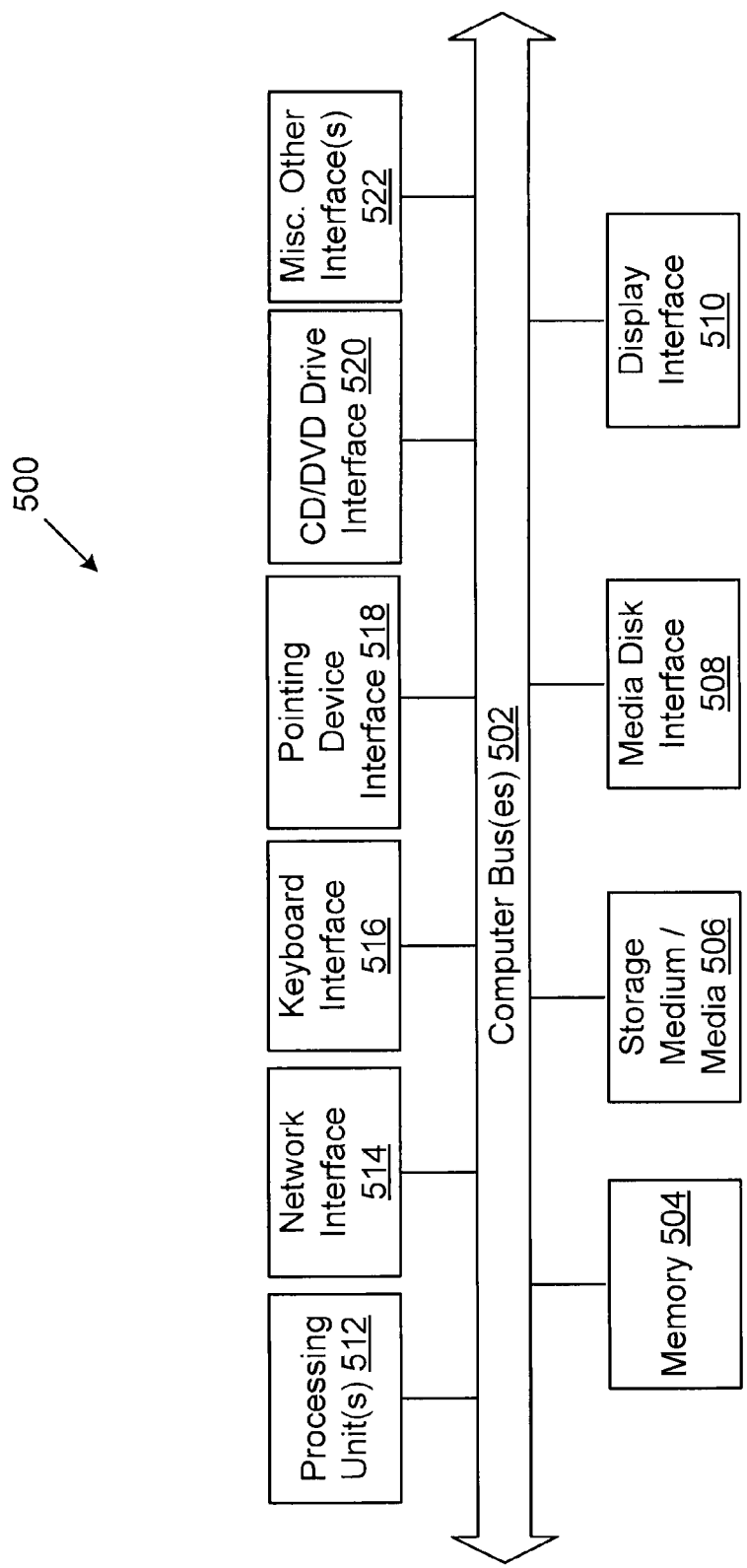
FIG. 6 is a block diagram illustrating an internal architecture of a computer in accordance with an embodiment of the present disclosure.

FIG. 6 is a block diagram illustrating an internal architecture of an example of a computer, such as server computer 130, 140 and/or client device 105, 110, 125, in accordance with one or more embodiments of the present disclosure. A computer as referred to herein refers to any device with a processor capable of executing logic or coded instructions, and could be a server, personal computer, set top box, tablet, smart phone, pad computer or media device, to name a few such devices. As shown in the example of FIG. 6, internal architecture 600 includes one or more processing units (also referred to herein as CPUs) 612, which interface with at least one computer bus 602. Also interfacing with computer bus 602 are persistent storage medium/media 606, network interface 614, memory 604, e.g., random access memory (RAM), run-time transient memory, read only memory (ROM), etc., media disk drive interface 608 as an interface for a drive that can read and/or write to media including removable media such as floppy, CD-ROM, DVD, etc. media, display interface 610 as interface for a monitor or other display device, keyboard interface 616 as interface for a keyboard, pointing device interface 618 as an interface for a mouse or other pointing device, and miscellaneous other interfaces not shown individually, such as parallel and serial port interfaces, a universal serial bus (USB) interface, and the like.

Memory 604 interfaces with computer bus 602 so as to provide information stored in memory 604 to CPU 612 during execution of software programs such as an operating system, application programs, device drivers, and software modules that comprise program code, and/or computer-executable process steps, incorporating functionality described herein, e.g., one or more of process flows described herein. CPU 612 first loads computer-executable process steps from storage, e.g., memory 604, storage medium/media 606, removable media drive, and/or other storage device. CPU 612 can then execute the stored process steps in order to execute the loaded computer-executable process steps. Stored data, e.g., data stored by a storage device, can be accessed by CPU 612 during the execution of computer-executable process steps.

As described above, persistent storage medium/media 606 is a computer readable storage medium(s) that can be used to store software and data, e.g., an operating system and one or more application programs. Persistent storage medium/media 606 can also be used to store device drivers, such as one or more of a digital camera driver, monitor driver, printer driver, scanner driver, or other device drivers, web pages, content files, playlists and other files. Persistent storage medium/media 606 can further include program modules and data files used to implement one or more embodiments of the present disclosure.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:

determining, by a server computer for a client device, a first identifier associated with the client device;

analyzing, by the server computer, an activity log associated with an account of a user to determine if an eavesdropping condition has been met during a given duration, the analysis comprising:

determining that an eavesdropping activity has occurred during the given duration and determining that no normal activity has occurred during the given duration for the first identifier;

determining a second identifier associated with a second device used to access the user account; and determining that a normal activity associated with the second identifier has occurred during the given duration; and when the eavesdropping condition has been met, marking, by the server computer, the account as compromised;

communicating, by the server computer, a result of the analysis.

2. The method of claim 1, further comprising storing, by the server computer, an activity that occurs for the account in the activity log.

3. The method of claim 1, further comprising grouping, by the server computer, the activity into a user activity group based on an identifier.

4. The method of claim 1, further comprising marking the account of the user as compromised.

5. The method of claim 1, wherein the analyzing the activity to determine if an eavesdropping condition is met further comprises determining that an unread email is read and then marked as unread.

6. The method of claim 1, wherein the analyzing the activity to determine if an eavesdropping condition is met further comprises determining that chat history has been searched.

7. The method of claim 1, wherein the analyzing the activity to determine if an eavesdropping condition is met further comprises determining that emails have been searched using a keyword.

8. The method of claim 1, wherein the analyzing the activity to determine if an eavesdropping condition is met further comprises determining that an email message has been sent and then deleted from the sent items folder.

9. The method of claim 1, wherein the analyzing the activity to determine if an eavesdropping condition is met further comprises determining that a chat session has occurred and then its logs have been deleted from chat history.

10. The method of claim 1, wherein the analyzing the activity to determine if an eavesdropping condition is met further comprises determining that an attachment from a read email has been downloaded.

11. The method claim 1, wherein the determining that a normal activity has occurred further comprises determining that an incoming email is read and not marked as unread.

12. The method claim 1, wherein the determining that a normal activity has occurred further comprises determining that an email is sent and not deleted from a sent items folder.

13. The method claim 1, wherein the determining that a normal activity has occurred further comprises determining that a chat has occurred with another user and a chat history for the chat has not been deleted.

14. The method of claim 1, further comprising communicating, by the server computer, a notification message to the user requesting the user to change a password associated with the account.

15. A computing device comprising:

a microprocessor of the computing device;

a storage medium for tangibly storing thereon program logic for execution by the microprocessor, the program logic comprising:

determining logic executed by the microprocessor for determining, for a client device, a first identifier associated with the client device;

analyzing logic executed by the microprocessor for analyzing an activity log associated with an account of a user to determine if an eavesdropping condition has been met during a given duration, the analysis comprising:

determining that an eavesdropping activity has occurred during the given duration and determining that no normal activity has occurred during the given duration for the first identifier;

determining a second identifier associated with a second device used to access the user account; and determining that a normal activity associated with the second identifier has occurred during the given duration; and marking logic executed by the microprocessor for marking, when the eavesdropping condition has been met, the account as compromised;

communicating logic executed by the microprocessor for communicating a result of the analysis.

16. The computing device of claim 15, further comprising storing logic executed by the microprocessor for storing an activity that occurs for the account in the activity log.

17. The computing device of claim 15, wherein the analyzing logic further comprises eavesdropping condition logic executed by the microprocessor for one or more of determining that an unread email has been read and then marked as unread, determining that chat history has been searched, determining that emails have been searched using a keyword, determining that an email message has been sent and then deleted from the sent items folder, determining that a chat session has occurred and then its logs have been deleted from chat history, and determining that an attachment from a read email has been downloaded.

18. The computing device of claim 15, wherein the analyzing logic further comprises normal activity logic executed by the microprocessor for one or more of determining that an unread email is read and then marked as unread, determining that a normal activity has occurred further comprises determining that an incoming email is read and not marked as unread, determining that an email is sent and not deleted from a sent items folder, and determining that a chat has occurred with another user and a chat history for the chat has not been deleted.

19. A non-transitory computer readable storage medium tangibly storing computer program instructions capable of being executed by a computer processor, the computer program instructions defining the steps of:

determining, by the computer processor for a client device, a first identifier associated with the client device;

analyzing, by the computer processor, an activity log associated with an account of a user to determine if an eavesdropping condition has been met during a given duration, the analysis comprising:

determining that an eavesdropping activity has occurred during the given duration and determining that no normal activity has occurred during the given duration for the first identifier;

determining a second identifier associated with a second device used to access the user account; and determining that a normal activity associated with the second identifier has occurred during the given duration; and when the eavesdropping condition has been met, marking, by the computer processor, the account as compromised;

communicating, by the computer processor, a result of the analysis.

\* \* \* \* \*